United States Patent [19]
Alia

[11] 3,971,882
[45] July 27, 1976

[54] ELECTRICAL CABLE HAVING AN OUTER SHEATH WITH IMPROVED PYROLYSIS PROPERTIES

[75] Inventor: Dominic A. Alia, Oakland, N.J.

[73] Assignee: The Okonite Company, Ramsey, N.J.

[22] Filed: Feb. 14, 1974

[21] Appl. No.: 442,333

Related U.S. Application Data

[62] Division of Ser. No. 316,848, Dec. 20, 1972, Pat. No. 3,821,139.

[52] U.S. Cl. .................. 174/110 SR; 174/110 AR; 174/110 PM; 174/120 AR; 174/120 SR
[51] Int. Cl.² ......................................... H01B 7/02
[58] Field of Search..... 174/121 A, 110 PM, 110 R, 174/120 AR, 120 SR, 110 AR, 110 SR; 252/8.1; 106/15 R; 260/23 H

[56] References Cited
UNITED STATES PATENTS

| | | | |
|---|---|---|---|
| 3,206,542 | 9/1965 | Dawson | 174/110 R |
| 3,405,204 | 10/1968 | McCormack | 260/23 H |
| 3,585,135 | 6/1971 | Smith | 252/8.1 |
| 3,600,469 | 8/1971 | Sato | 260/23 H |

Primary Examiner—E. A. Goldberg
Attorney, Agent, or Firm—Hopgood, Calimafde, Kalil, Blaustein & Lieberman

[57] ABSTRACT

In combination in an electric cable, at least one conductor, an essentially smokeless insulating jacket enclosing said conductor, the jacket consisting essentially of a chlorosulfonated polyethylene having uniformly dispersed therethrough an amount of magnesium oxide at least sufficient to suppress substantial cable jacket smoking when the cable is subjected to pyrolysis.

2 Claims, 1 Drawing Figure

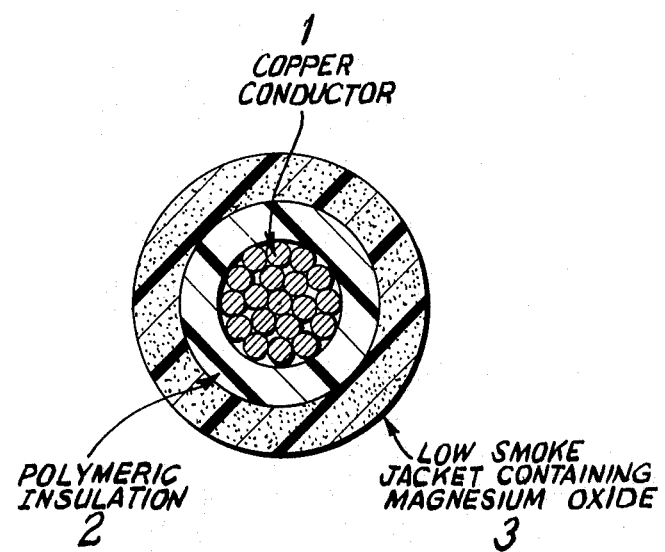

ELECTRICAL CABLE HAVING AN OUTER SHEATH WITH IMPROVED PYROLYSIS PROPERTIES

This application is a division of Ser. No. 316,848, filed Dec. 20, 1972 now U.S. Pat. No. 3,821,139 issued June 28, 1974. This invention relates to electrical wire and cable and, more specifically, to an improved insulated, jacketed cable which will not support combustion and, moreover, which does not emit substantial smoke during pyrolysis.

It is obviously important in numerous applications of present day interest that electrical cable, comprising one or more mutually insulated electrical conductors surrounded by an outer jacket, or sheath, not sustain combustion. Such cable does not, therefore, serve as fuel to aid a local fire, or as a medium to proliferate any such combustion.

However, in certain environments, it is highly desirable also that the cable jacket not emit substantial smoke during burning. Thus, for example, local trash fires in close proximity to electrical power and signaling cables are not uncommon in subway systems or the like, these fires being disruptive but not overly dangerous per se. However, the psychological and, to a lesser extent, physiological effects of acrid smelling, black enshrouding smoke, produced by burning cable, on those confined in the environment, e.g., a stationary subway car, are indeed dangerous and have, in fact, cause injury and fatality. Other environments where smokeless cable is a patent desideratum are mining, construction (especially schools, hospitals and the like, shipbuilding and power (particularly for nuclear reactor control and shutdown).

However, it has long been appreciated as a general matter that those organic materials (as cable jacket materials typically are) which do not burn, smoke, and, conversely, those which do not smoke, burn. Thus, for example, conventional cable jacketings made of polychloroprene, chlorosulfonated polyethylene, polyvinyl chloride or chlorinated polyethylene, will not sustain combustion, but do yield very substantial smoke and off-gas pyrolysis products when burned. This is typically the case for chlorinated elastomeric polymers.

Accordingly, economically realistic electrical cabling which would neither burn nor smoke has heretofore not been available.

It is therefore an object of this invention to provide an essentially smokeless electrical cable jacket material.

More specifically, it is an object of the present invention to provide such a smokeless cable jacket which may be readily fabricated in commercial quantities of the "customary" kinds of materials heretofore employed for electrical cable manufacture.

The above and other objects of the present invention are realized in a specific, illustrative embodiment thereof, wherein an electrical cable comprises at least one electrical conductor surrounded by an insulation layer and an outer jacketing sheath. , reference being made to the accompanying drawing The cable jacket is preferably formed of chloro-sulfonated polyethylene and chlorinated polyethylene elastomeric polymers (approximately 50% by weight); a tri-cresyl phosphate plasticizer (approximately 7.5% by weight); and additional extenders, vulcanizing agents and processing aids as more fully set forth below.

The cable jacket formed as above-described is superior to comparable cable sheaths of the prior art. First, the jacket will not support combustion. Indeed, when exposed to direct flame, the operating time to cable electrical failure is several times longer for cables with the instant jacket than for polychloroprene or other conventional chlorinated polymer sheathed cables. Then also, cable in accordance with the present invention emitted very little smoke during pyrolysis vis-a-vis prior art cable.

The above-considered features and advantages of the present invention will become more clear from the following detailed discussion of specific embodiments and examples thereof.

In accordance with the basic principles of the present invention, a cable jacket system includes chloro-sulfonated polyethylene (e.g., duPont's Hypalon), and magnesium oxide. The system further comprises additional rubber-like polymer, extenders, a filler-pigmentation, vulcanizing agents, all as set forth in particular detail hereinbelow.

The cable jacket formed by this invention will not sustain combustion and, in fact, resists an applied flame and continues to perform electrically for a period greatly exceeding that for a polychloroprene or other conventional chlorinated polymer jacketed cables. An electric cable in accordance with the invention is shown in the drawing comprising copper conductor 1 surrounded by a polymeric insulation 2, which insulation is surrounded by the low smoke jacket of the invention 3 containing magnesium oxide.

Moreover, the cable jacket in accordance with the present invention off-gasses only minimal smoke when flame is applied thereto — and that notwithstanding that the primary constituents thereof, chlorinated rubber, and most others as well, smoke when burned. The specific reasons why the instant cable jacket is smokeless are not precisely understood. However, by way of illustration and without limitation, it is postulated that an intumescenece mechanism characterizing the instant cable is responsible for the smoke-suppressing and flame retardant cable properties; that is, when flame is applied to the cable jacket composition, it swells into a foamed or sponge-like physical texture. The expanded jacket matrix upon intumescence traps particulate matter (e.g., carbon black) which would otherwise escape upon pyrolysis to cause an acrid, opaque smoke. The multi-celled structure formed upon swelling also comprises relatively poor heat conductors, hence expanding the operative cable life during flame during which the jacket protects the interior insulation and electrical conductors from the heat source.

With the above considerations in mind, specific examples for practice of the present invention will now be considered.

EXAMPLE 1

An electrical cable jacketing material was formed of:

a. chloro-sulfonated polyethylene (CSP) elastomeric polymer, such as that vended under the trade name Hypalon by the duPont Company — 40% by weight, as the basic rubber-like polymer matrix;

b. chlorinated polyethylene (CP) elastomeric polymer — 10% by weight; for its mechanical elasticity;

c. clay, principally comprising hydrated aluminum silicate —23.75% by weight. The clay is employed as a processing agent and extender for the rubber matrix, and to also impart processing elasticity to the basic rubber material;

d. carbon black as a filler and coloration agent — 10% by weight;

e. magnesium oxide, 5% by weight. The magnesium oxide acts as a vulcanizing aid and, moreover, is understood to play a significant role in imparting the non-smoking, intumescing property to the final rubber jacket composition. The magnesium oxide may be utilized in a dispersion thereof protected from water attack as vended by Wyrough & Loser, Trenton, N.J.;

f. stearic acid — 0.5% by weight, as a mill release processing aid;

g. tri-cresyl phosphate (TCP), a plasticizer with extremely low volatility (a boiling point at 420°C) — 7.5% by weight;

h. paraffin, a processing aid and lubricant — 2.0% by weight;

i. vulcanizing agents comprising sulfur (0.25% by weight) and tetramethylthiuram-disulfide (TMTD) — 1.0% by weight.

The jacket material is formed by mixing the CSP, CP, clay (10% of the 23.75%), carbon black and magnesium oxide in an internal mixer (e.g., a Banbury) at a low speed (approximately 22 RPM), with the ram pressure applied, for approximately 3 minutes. The ram was then raised and the stearic acid, TCP, paraffin and remaining clay added. The ram was lowered and the constituents again mixed at low speed for approximately 2 minutes.

Finally, the sulfur and TMTD were added and the composite system mixed for 1.5 minutes, maintaining the mixing temperature below 250°F by a flow of cooling water through the Banbury blades and shell. The composite material so formed was finally formed into cable jacketing by conventional milling and extrusion about the cable electrical conductors and surrounding insulation.

The above cable jacket system, which comprises a preferred embodiment of my invention, was exposed to a gas flame in a test chamber and the same flame exposure applied to standard polychloroprene or other conventional chlorinated polymer jacketed cables. As above described, the cabling of the instant invention survived approximately two times longer before an electrical failure resulted vis-a-vis the polychloroprene or other conventional chlorinated polymer jackets. During burning, the instant cable jacket intumesced.

FURTHER EXAMPLES

Cable jacketing material was prepared as above-described but with the magnesium oxide present at the 2.5% and 7.5% levels. At 2.5% of magnesium oxide, the smoke emitted during burning was substantially less than that exhibited by a polychloroprene cable but exceeded that for the cable of Example 1. For the 7.5% level, only a very small, insubstantial improvement in smoke diminution was observed vis-a-vis the jacket composition of Example 1.

Then also, the electrical cable jacket of Example 1 was fabricated but: (1) in one case, using chlorinated paraffin rather than tri-cresyl phosphate as a plasticizer; and (2) in another example, a calcined rather than hydrated clay. In neither case was the "smokeless" properties of the jacketing material so formed impaired.

In addition to the fire-exposure tests described above for the fully formed electrical cable including the sheaths of Example 1, each cable jacket described herein was exposed to a like flame in a hood, and the optical impedance between a light source and a photodetector spaced therefrom measured as a function of time (as was a prior art polychloroprene or other conventional chlorosulfonated polyethylene, chlorinated polyethylene or polyvinyl chloride sheath material). In each case, the smoke reduction or substantial suppression far exceeded the properties of the above-mentioned conventional materials.

The above-described arrangements and compositions are merely illustrative of the principles of the present invention. Numerous modifications and adaptations thereof will be readily apparent to those skilled in the art without departing from the spirit and scope of the present invention.

What is claimed is:

1. In combination in an electrical cable, at least one conductor, an essentially smokeless insulating jacket enclosing said conductor, said jacket consisting essentially of approximately 40% by weight chloro-sulfonated polyethylene, approximately 10% by weight chlorinated polyethylene, approximately 23.75% by weight clay, approximately 10% by weight carbon black, approximately 5% by weight magnesium oxide, approximately 0.5% by weight stearic acid, approximately 7.5% by weight tri-cresyl phosphate, approximately 2% by weight paraffin, approximately 0.25% by weight sulfur and approximately 1.0% by weight tetramethylthiuram-disulfide.

2. In combination in an electrical cable, at least one conductor, an essentially smokeless insulating jacket enclosing said conductor, said jacket consisting essentially of chloro-sulfonated polyethylene and chlorinated polyethylene having uniformly dispersed therethrough at least about 2.5% by weight of magnesium oxide effective to impart an intumescence property to said composition when subjected to elevated temperatures.

* * * * *